April 21, 1970     S. KORMAN     3,507,697
PROCESS FOR PREPARING NICKEL ELECTRODES
Filed Aug. 15, 1967
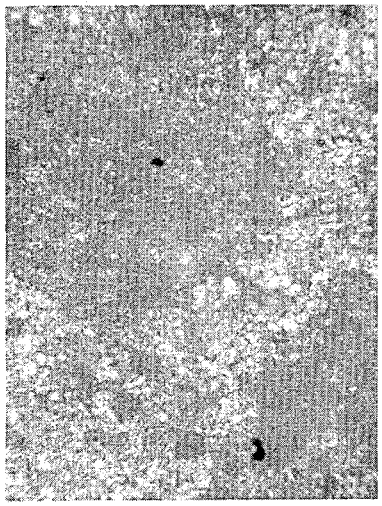
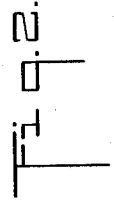
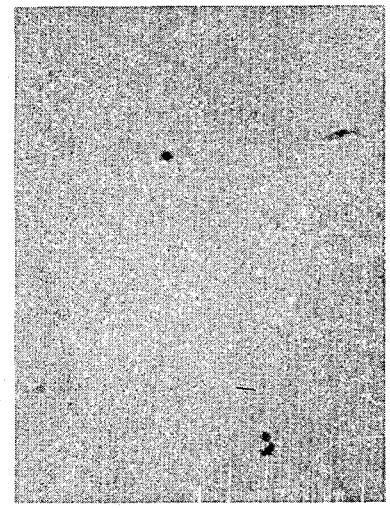
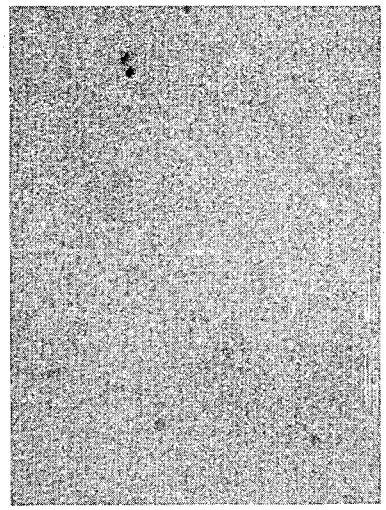
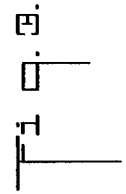
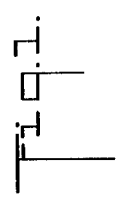

United States Patent Office 3,507,697
Patented Apr. 21, 1970

---

3,507,697
PROCESS FOR PREPARING NICKEL ELECTRODES
Samuel Korman, Hewlett, N.Y., assignor to Portable Power Corporation, New York, N.Y., a corporation of New York
Filed Aug. 15, 1967, Ser. No. 661,501
Int. Cl. H01m *43/04, 35/18*
U.S. Cl. 136—29                                    9 Claims

ABSTRACT OF THE DISCLOSURE

The disclosure relates to electrodes for use in secondary battery sources and improvements in the process of making the same. In particular, it relates to the preparation of nickel electrodes whereby a porous nickel plaque is impregnated with a nickel salt solution and the nickel ion is reacted in situ with a carbonate anion which forms a water-insoluble salt. The plaque is then electrolyzed in an alkaline aqueous solution to activate the same.

---

This invention relates to electrodes and more particularly to positive electrodes suitable for nickel-cadmium, nickel-iron and nickel-zinc alkaline storage batteries and to the method for preparing the same.

Applicant acknowledges the invention of John T. Owen, now deceased, as described in pending U.S. patent application Ser. No. 629,329 filed Apr. 1967 and assigned to the assignee of the present application. The present application is the sole invention of the applicant and represents further improvement in electrodes for secondary battery sources and processes for their production.

Various methods are currently in commercial use for the production of electrodes for use in secondary batteries however, all evidence certain difficulties by requiring a time-consuming and costly process and by producing a final product which has low capacity and is void of homogeneity, but instead is non-uniform in structure.

Such methods have included preparing a nickel plaque or matrix and immersing a group of such plaques or matrices in a nearly saturated solution of nickel nitrate. The loaded plaques are subseqeuntly activated by electrolyzing them in a strong solution of sodium or potassium hydroxide. This method normally requires repeated impregnation steps and a prolonged washing period subsequent to each impregnation and overall necessitates an abnormally long period of time to process a completed electrode.

A second commercial method that is utilized includes impregnating a porous sintered nickel plaque with nickel hydroxide by immersing the heated plaque in a molten bath of hydrous nickelous nitrate. The plaques are then roasted at elevated temperature in order to decompose the nickel nitrate into a product intermediate between nickel nitrate and nickel hydroxide. A subsequent step involves immersing the plaques in a hot concentrated potassium hydroxide solution which converts the intermediate product nickel hydroxide. A final washing and drying step is then applied.

These previous processes, however, have failed to produce an electrode having a good degree of reproducibility, but instead formed final products having wide ranges of capacities from which selections had to be made in order to obtain an electrode with any given specific capacity.

In addition, the electrodes formed by the prior methods are largely lacking in homogeneity and have tended to develop non-uniform surfaces, and blistering in certain portions thereof due to an irregular or non-homogeneous compositon. Non-uniformity of the active material causes serious problems when the electrodes are fabricated into a battery. It is found that a non-uniform current distribution develops over the available surface of the electrode since the current seeks the path of lowest resistance. As a result, the electrode does not produce its maximum capacity and the capacity characteristics are unpredictable from sample to sample.

Furthermore, prior art electrodes show a marked tendency toward loss of physical integrity and strength and suffer from flaking of active matreial or distortion of the electrode which lead to premature failure of the battery.

In accordance with the present invention, electrodes are produced which have a high degree of predictable reproducibility and thus eliminate the need for the further step of selecting certain electrodes of a desired capacity now commercially required. In addition, the electrodes produced by the present process display excellent capacity characteristics, high strength and dimensional stability. Electrodes produced according to this invention are highly suitable for commercial use.

The process of the present invention for producing the novel electrodes hereinabove is a fully unified process requiring relatively few, simple and comparatively rapid steps to effect the final product electrode and thus contributes a significant economical, time saving process when viewed in light of the prior art method requiring time consuming, complex and expensive steps to eventually produce a product electrode which falls short of the favorable characteristics required in electrodes and present in the electrodes produced by the process herein described.

The process of the present invention for preparing electrods comprises the steps of impregnating a porous nickel conducting matrix such as a sintered nickel plaque with an aqueous solution of a water soluble salt of nickel thereby forming an impregnated matrix; contacting said impregnated matrix with an aqueous solution of carbonate ion which forms a water-insoluble salt of said nickel and said carbonate; and electrolyzing the impregnated matrix containing the insoluble salt of nickel and said carbonate at a high current density for a sufficient time in an alkaline electrolyte to cause said matrix to become activated.

FIGURE 1 is a photomicrograph, taken at a magnification of 50×, and shows the surface of a sintered nickel plaque prior to treatment;

FIGURE 2 is a photomicrograph, taken at a magnification of 50×, and shows the non-homogeneous structure and surface of a commercially available nickel electrode produced by a standard prior art process;

FIGURE 3 is a photomicrograph, taken at a magnification of 50×, and shows the homogeneous structure and surface of an electrode produced by the process in accordance with the present invention.

The matrix or plaques which are employed in the practice of the invention are porous nickel bodies which are commonly used in the fabrication of electrodes. Such porous nickel bodies are generally of sintered metal powder, metal screens or grids, etc. In the preferred embodiment, sintered nickel plaques are used as prepared from a fine nickel powder derived from the thermal decomposition of nickel carbonyl. The degree of porosity, size of pores and overall dimensions of the actual plaque may vary according to the particular desired end use of the electrode being produced.

In the practice of this invention, the porous nickel plaque is impregnated with an aqueous solution of a nickel salt. Suitable nickel salts for the purpose include nickel nitrate, nickel acetate, nickel bromate, nickel bromide, nickel chloride, nickel perchlorate, nickel iodide and nickel sulfate. It has been found preferable to employ the nitrate salt of nickel because of its availablity and its high degree of solubility. The preferred salt for this impregnation step, therefore, is nickel nitrate and in actual practice the use of this salt has been found to achieve highly successful results.

Since the object of this impregnation step is to introduce the maximum quantity of the active nickel into the porous plaque, it is most desirable to use the nickel salt at or close to its saturation point. To aid in this effect, elevated temperatures may be employed in increasing the solubility of the nickel salt.

The maximum concentration of the nickel ion in the impregnating solution is limited only by the solubility of the salt employed under the conditions used. The nickel salt should, however, have sufficient solubility to obtain a concentration of at least about 25 grams of nickel ion per liter of solution.

The impregnation step may be generally carried out by any known means whereby the porous plaque is sufficiently loaded with the nickel salt solution. One method found desirable to effect sufficient dispersion of the metal ion throughout the nickel plaque is by vacuum impregnation. In order to maximize the amount of nickel-containing solution retained by the porous plaque, it is preferable to break the vacuum while the plaque is in contact with the impregnating solution.

After impregnation with the metal salt solution, the loaded plaque is allowed to drain and the unsorbed portion of the solution of the nickel salt is removed. The impregnated plaque is then contacted with an aqueous carbonate solution which forms, with the nickel of the nickel salt, a water-insoluble carbonate of nickel.

The carbonate anion is employed in aqueous solution and therefore, is derived from a water soluble carbonate salt. The alkali metal salts are generally preferred because of their availability and comparatively high solubility. Suitable alkali metal carbonates which can be used include sodium carbonate, sodium bicarbonate, potassium carbonate and potassium bicarbonate. Generally, the solution of the carbonate anion employed will contain from about 0.5 to about 5 moles per liter or more of the anion, and the preferable range is in the order of about 1 to 3 moles per liter.

The carbonate anion forms an insoluble nickel carbonate having solubility less than about 1 gram per liter. In addition, the nickel carbonate compound is crystalline in nature rather than gelatinous and thus, the amount of entrained water and undesirable ions is minimized.

The impregnated plaque is most easily contacted with the carbonate treating solution by immersion with or without vacuum, although other comparable techniques are also applicable. Contact between the impregnated plaque and the carbonate solution should be maintained for a sufficient period of time to insure that substantially all of the nickel ion will be insolubilized. Generally, this occurs in about 5 to 30 minutes, depending on the size of the plaque, the degree of porosity, etc. Elevated temperatures of the order of 100 to 200° F. are helpful during the reaction.

The plaque is then separated from the treating solution and allowed to drain and, if desired, desiccated to vacuum dryness while maintaining the temperature in the vacuum chamber. In the preferred embodiments of the invention, a large portion of the anion of the original metal salt, e.g. nitrate ion, will be carried off at this point because of the non-retentive nature of the insoluble nickel carbonate formed. This is especially advantageous in that it greatly reduces the after treatment required to remove the undesirable ions.

The nitrate may, however, be removed at this point by reacting the nitrate with an enediol compound. This means of removing the nitrate is more fully expained and described in the aforementioned application of John T. Owen, Ser. No. 629,329 filed Apr. 7, 1967 and it is understood that a similar treatment may be utilized here.

After the formation of the insoluble nickel carbonate (and reduction of nitrate ion, if employed) the plaque may then be dried, if desired. Drying can be accelerated by the use of mild heating, it being understood, however, that any such heating will be carried out such that complete loss of the carbonate does not take place.

After the drying step, if employed, the plaques containing the insoluble salt of nickel and said carbonate are electrolyzed in an alkaline aqueous solution electrolyte by connecting the plaque to the positive pole of a suitable direct current source. The electrolyte is preferably a strongly alkaline solution such as an alkali metal hydroxide solution and in the preferred embodiment, the electrolyte is an aqueous solution of potassium hydroxide. The concentration of alkali in this solution may generally be within the approximate range of 5 to 50% and the preferred solution is about 30 to 45% by weight of KOH in water.

The plaques are electrolyzed at a high current density to obtain the desired degree of activation. The current density applied may vary between 0.5 to 2 amperes per square inch of electrode surface. Substantially lower current densities may result in incomplete activation, and substantially higher current densities may cause burning or physical deformation of the plaques. The precise current density employed will depend upon the thickness, density or porosity of the nickel plaque. The voltage applied will normally be in the range of about 2 to about 5 volts. The electrolysis is carried out for a time sufficient to activate the nickel plaques and typically will be from 0.25 to 20 hours, depending upon the current imposed, the plate thickness and the amount of active material in the plate.

After the electrode has been fully activated by high current density electrolysis, it is removed from the electrolyte and may then be rinsed to remove any portion of the electrolyte that may remain. This step, however, is optional as the electrode is fully activated during electrolysis and no further steps need be taken to make the electrode fully operational.

The foregoing process may also be performed with a variation whereby the plaques may be first electrolyzed at a high current density while they are in contact with the aqueous carbonate solution. Following this electrolysis at high current density, the plates are electrolyzed in an aqueous solution of alkali metal hydroxide and preferably, potassium hydroxide. In this embodiment of the invention, the electrolysis at high current density is carried out as described previously except that the aqueous carbonate solution is used as the alkaline electrolyte. The subsequent electrolysis in alkali metal hydroxide is preferably carried out under normal charge-discharge conditions, e.g., at a current density of about 0.05 to 0.5 ampere per square inch and a voltage of about 1.3 to 5 volts.

The following examples are given to illustrate practice of specific embodiments of the invention:

Example 1

Three sintered nickel plates having a thickness of .100 inch and a total weight of 31.9 grams are impregnated under a pressure of 35 mm. Hg with a saturated aqueous nickel nitrate solution. The vacuum is broken and the plates are dried at a tempreature of about 80° C. for twenty minutes to a constant weight. The plates are again weighed and found to be a total of 54.1 grams.

The nickel plates are then immersed for twenty minutes in a solution of potassium carbonate having a concentration of 720 grams per liter of $K_2CO_3$. The plates are again dried for twenty minutes at 80° C. and are weighed, and it is found that the three plates show a total increase of 22.4 grams over their original weight.

The nickel plates are then assembled in an anodizing tank with a metallic nickel sheet as the cathode. A 42% aqueous potassium hydroxide solution is added as the electrolyte and the plates are electrolyzed at 10 amperes for about 15 hours with the nickel electrodes connected to the positive pole of the direct current source. The current increases to 12.5 amperes by the end of the 15 hour period. This is generally equivalent to a current density of 1.0 ampere per square inch.

The activated plates are then assembled with cadmium negative plates and paper separators. The thus-formed cell is discharged at a current of 0.5 ampere for about 7 hours. A total of approximately 3.5 ampere-hours is obtained before the observed voltage drops to about 1.05 volts.

The cell is then recycled by charging at 1.47 volts for 14 hours and is again discharged. A total of 3.5 ampere-hours is obtained by discharging at .75 ampere before the voltage falls below 1.00 volt at about 4 hours and 40 minutes.

The cell is recycled three more times in similar fashion and in each instance, the recharging and quick discharge are found highly satisfactory and each discharge yields a value of higher than 3.0 ampere-hours. The theoretical calculated capacity based on the nickel nitrate initially absorbed is 2.07 ampere-hours.

Example 2

The procedure of Example 1 is repeated using three sintered nickel plates, having a total weight of 28.0 grams. As the final drying step, the plates are heated to a tempertaure of 450° F. for a forty-five minute period, this being below the thermal decomposition temperature of the nickel carbonate compound formed. The plates are weighed and it is found that the three plates show a total increase of 12.3 grams.

The plates are activated as in Example 1 for fifteen hours at 10 amperes current in a solution of 42% KOH by weight. This is generally equivalent to a current density of 1.0 ampere per square inch. The plates are then discharged at a current of 0.35 ampere. The discharge was discontinued after 8 hours and 5 minutes with the voltage at 1.10 volts. At this point, the cell has produced 3.5 ampere-hours.

The cell is then recycled twice at 1.52 and 1.55 volts respectively for 14 hours and in each instance, the discharge is very satisfactory and each produces 3.75 ampere-hours of capacity.

The cell is again recharged for 14 hours at a voltage of 1.46 volts and discharged at a very high rate. Again, the results show a high capacity, that of 3.5 ampere-hours.

A further recycle at 14 hours with an open circuit voltage of 1.56 provides results of 3.37 ampere-hours after 4½ hours when the voltage drops to 1.00 volt at .75 ampere.

Example 3

The procedure of Example 1 is followed except that the sintered nickel plates are .200 inch in thickness and after treating in accordance with Example 1, the plates are physically compressed under a pressure of about 5000 pounds per square inch to a thickness of .100 inch.

The total weight of the three plates before treatment is 59.30 grams and after treatment it is found that the total weight is increased by 45.20 grams.

The plates are activated as in Example 1 by subjecting them to a current density of 1 ampere per square inch for a period of 13.5 hours.

The plates are assembled with cadmium electrodes as before and discharged and have an open circuit voltage of 1.33 volts at a current of 0.75 ampere. After approximately 7.5 hours, the voltage drops below 1.03 volts and the total capacity is measured as 5.63 ampere-hours.

The cell is recycled three times, for periods of 10 hours, 14 hours and 8 hours at different charge rates and again discharged. In each instance the discharge produces a capacity in excess of 4.5 ampere-hours. The theoretical calculated capacity based on the amount of nickel nitrate absorbed is 3.95 ampere-hours.

Example 4

The procedure of Example 1 is followed using plates having a thickness of .030 inch. The initial total weight of the three plates, before treatment, is 11.30 grams and after treatment, the total weight is increased by 6.70 grams.

The three plates are activated as in Example 1 for ½ hour at 11 amperes, which is equivalent to a current density of 1.0 ampere per square inch. They are then charged for 1½ hours at 17 amperes, a current density of 1.5 amperes per square inch.

The plates are then subsequently assembled with cadmium electrodes and discharged at .25 ampere and an open circuit voltage of 1.33 volts for a period of approximately 4½ hours, whereupon the voltage drops below 1.03 volts. Over this period, the capacity produced is 1.15 ampere-hours. The theoretical calculated capacity based on the weight of nickel nitrate absorbed is 0.565 ampere-hour.

Example 5

Three sintered nickel plates having a thickness of .100 inch are impregnated with nickel nitrate following the procedure of Example 1. The plates are then removed and charged at high current density in a solution of $K_2CO_3$ having a concentration of approximately 720 grams per liter. The charging conditions are about 14 hours at a current of 11 amperes.

The plates are then discharged in a manner similar to Example 1 in 30% potassium hydroxide electrolyte at an open circuit voltage of 1.30 volts and a current of .5 ampere. The plates are then recharged in the same electrolyte at a current of 1.1 amperes for a period of 14 hours. This corresponds to a current density of about .1 ampere per square inch.

Again the plates are discharged at .5 ampere and with an open circuit voltage of 1.42 volts, and are found to produce an output of 3.25 ampere-hours.

What is claimed is:

1. The process for preparing nickel electrodes consisting essentially of the steps of impregnating a porous nickel matrix with an aqueous solution of a water-soluble nickel salt; contacting the matrix impregnated with said water-soluble nickel salt with an aqueous carbonate solution for thus forming a water-insoluble carbonate of nickel in the interstices of said matrix; and electrolyzing said matrix containing said water-soluble carbonate of nickel at high current density in an alkaline electrolyte.

2. The process of claim 1 wherein said matrix impregnated with said water-soluble nickel salt is contacted with said aqueous carbonate solution and simultaneously electrolyzed at high current density and thereafter is electrolyzed in an aqueous solution of at least one alkali metal hydroxide.

3. The process of claim 1 wherein said matrix impregnated with said water-soluble nickel salt is first contacted with said aqueous carbonate solution and thereafter electrolyzed at high current density in an aqueous solution of at least one alkali metal hydroxide.

4. The process for preparing nickel electrodes consisting essentially of the steps of impregnating a porous nickel matrix with an aqueous solution of a water-soluble nickel salt; electrolyzing said matrix impregnated with said water-soluble nickel salt at a current density of between about 0.25 to 2 amperes per square inch for a period of between 0.25 to 20.0 hours in an aqueous carbonate solution and thereafter electrolyzing said matrix in an aqueous solution of at least one alkali metal hydroxide.

5. The process of claim 4 wherein said alkali metal hydroxide is potassium hydroxide.

6. The process of claim 5 wherein said water-soluble nickel salt is nickel nitrate.

7. The process for preparing nickel electrodes consisting essentially of the steps of impregnating a porous nickel matrix with an aqueous solution of a water-soluble nickel salt; contacting the matrix impregnated with said water-soluble nickel salt with an aqueous carbonate solution and thereafter electrolyzing said matrix at a current density of between 0.25 to 2.0 amperes per square inch for between about 0.25 to 20.0 hours in an aqueous solution of at least one alkali metal hydroxide.

8. The process of claim 7 wherein said alkali metal hydroxide is potassium hydroxide.

9. The process of claim 8 wherein said water-soluble nickel salt is nickel nitrate.

References Cited

UNITED STATES PATENTS 2,162,385   6/1939   Langguth _____ 136—28 XR
3,274,028   9/1966   Okinaka et al. _____ 136—29
3,284,237   11/1966  Lambert et al. ____ 136—67 XR WINSTON A. DOUGLAS, Primary Examiner A. SKAPARS, Assistant Examiner U.S. Cl. X.R.

136—67, 76, 78